(12) United States Patent
Mis et al.

(10) Patent No.: US 7,989,536 B2
(45) Date of Patent: Aug. 2, 2011

(54) EXFOLIATED NANOCOMPOSITES AND ARTICLES CONTAINING SAME

(75) Inventors: Mark R. Mis, Hornell, NY (US); Douglas R. Robello, Webster, NY (US); Thomas N. Blanton, Rochester, NY (US); Craig L. Barnes, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 311 days.

(21) Appl. No.: 12/240,073

(22) Filed: Sep. 29, 2008

(65) Prior Publication Data

US 2010/0081749 A1 Apr. 1, 2010

(51) Int. Cl.
*C08L 25/06* (2006.01)

(52) U.S. Cl. ........ 524/445; 524/515; 524/447; 524/570; 525/241

(58) Field of Classification Search ................... 524/445, 524/515, 447, 570; 525/241
See application file for complete search history.

(56) References Cited

U.S. PATENT DOCUMENTS

| 6,646,068 | B2 | 11/2003 | Chisholm et al. | |
|---|---|---|---|---|
| 6,686,407 | B2 * | 2/2004 | Robello et al. | 524/445 |
| 6,867,255 | B2 | 3/2005 | Robello et al. | |
| 7,166,657 | B2 | 1/2007 | Rao et al. | |
| 2005/0038167 | A1 * | 2/2005 | Plummer et al. | 524/445 |

* cited by examiner

*Primary Examiner* — Kelechi C Egwim
(74) *Attorney, Agent, or Firm* — J. Lanny Tucker

(57) ABSTRACT

A polymeric nanocomposite comprises a non-polar hyperbranched polystyrene resin. An exfoliated or intercalated onium functionalized clay is dispersed within the resin. Such nanocomposites are more compatible with non-polar polymer matrices used in various articles of manufacture.

7 Claims, 1 Drawing Sheet

EXFOLIATED NANOCOMPOSITES AND ARTICLES CONTAINING SAME

FIELD OF THE INVENTION

This invention relates to exfoliated or intercalated polystyrene-clay nanocomposite compositions, and to articles in which these compositions are incorporated.

BACKGROUND OF THE INVENTION

There have been extensive efforts directed towards the preparation of various polymer-clay composite materials since the discovery of exfoliated nylon/clay nanocomposites by Usuki et al. (*J. Mater. Res.* 1993, 8, 1174). Such materials are expected to have new and improved mechanical, thermal, and barrier properties compared to those of the polymers alone.

Incorporation of a few percent of clay has been found to greatly increase a polymer's modulus, strength, gas barrier properties, and heat distortion temperature. The presence of clay is also reported to impart fire retardant properties. Without wishing to be bound by theory, the improvement in thermal stability is believed to be attributed to tortuous diffusion of the volatile thermal and therm-oxidative decomposition products in the presence of dispersed silicate layers. The slower diffusion of decomposed volatiles along with structural reinforcement provided by the char formed with collapsing silicate layers during combustion contributes to decreased flammability of exfoliated nanocomposite as demonstrated by cone calorimetry. See for example, J. Zhu and C. A. Wilkie *Polym. Int.* 2000, 49, 1158; and J. W. Gilman *Appl. Clay Sci.* 1999, 15, 31.

The most common morphology for miscible polymer-clay dispersions is known as intercalation. In this case, the host polymer penetrates the space between the clay platelets, but separating them only slightly and maintaining the parallel, regular structure of the platelets. Intercalated polymer-clay nanocomposites are often observed to have measurable improvements in physical properties, but typically less so than if the corresponding nanocomposites were in the morphology known as exfoliation. Although exfoliation is much more desirable, it is less common and more difficult to obtain. In this morphology, the clay platelets are thoroughly separated from each other by the host polymer, so that their original crystallographic register is lost. Particularly for nonpolar polymer hosts, the fully exfoliated polymer-clay nanocomposites are notoriously difficult to obtain.

Non-polar polymers, including polystyrene and polyethylene, represent a group of commercially important thermoplastics. Polystyrene and linear low density polyethylene (LLDPE) homopolymers form intercalate morphologies when melt blended with organically modified clays known as organoclays. See, for example, R. A. Vaia and E. P. Giannelis *Macromolecules* 1997, 30, 8000, and also K. H. Wang et al. *Polymer*, 2001, 42, 9819.

Although exfoliation of clay in these non-polar polymers is more desirable, achieving this state of morphology is particularly challenging because the polymers are not strongly attracted to the clay surfaces. One approach to achieve this goal is in-situ polymerization of non-polar monomers in the presence of organoclay bearing either polymerizable functional groups or initiators. See, for example, X. Fu and S. Qutubuddin *Polymer* 2001, 42, 807; J. Zhu et al, *Chem. Mater.* 2001, 13, 3774; and M. W. Weimer et al. *J. Am. Chem. Soc.* 1999, 121, 1615.

Another method to achieve exfoliation of such non-polar polymers is to incorporate polar units in the backbone of non-polar guest polymers and subsequently melt blend them with a host organoclay. See, for example, N. Hasegawa et al. *J. Appl. Polym. Sci.* 1999, 74, 3359; and C. I. Park et al. *Polymer* 2001, 42, 7465. The latter strategy is industrially more feasible, but increasing the fraction of polar units in non-polar polymers may result in undesirable morphological changes, e.g., phase separation. Thus, complete exfoliation of organoclay in non-polar homopolymer has not been commercially or economically practicable on a comparable scale.

U.S. Pat. No. 7,166,657 (Rao et al.) describes the use of highly branched polar polymers to splay various clays to form nanocomposites for various uses.

U.S. Pat. No. 6,686,407 (Robello, et al.) describes the use of star-branched polystyrene to achieve exfoliation of organoclays. A theoretical treatment of this approach is given by Singh and Balazs (*Polym. Int.* 2000, 49, 469). Exfoliated nanocomposites were achieved, but such star-branched polymers are laborious and expensive to synthesize and a more practical technique is highly desirable.

PROBLEM TO BE SOLVED

There is a need to provide nanocomposites using non-polar polymers with clays using less expensive reactants and methods of preparation. Such nanocomposites would be more compatible with non-polar polymer matrices used in various articles of manufacture and exhibit improved physical strength as well as other properties.

SUMMARY OF THE INVENTION

The present invention is directed to a polymeric nanocomposite comprising a non-polar hyperbranched polystyrene resin and having dispersed therein an exfoliated or intercalated onium functionalized clay.

This invention also provides an article comprising a matrix and a polymeric nanocomposite comprising a non-polar hyperbranched polystyrene resin and having dispersed therein an exfoliated or intercalated onium functionalized clay.

The present invention polymeric nanocomposites with improved strength and compatibility with non-polar materials into which they can be mixed for various articles of manufacture.

DETAILED DESCRIPTION OF THE INVENTION

Figure 1:
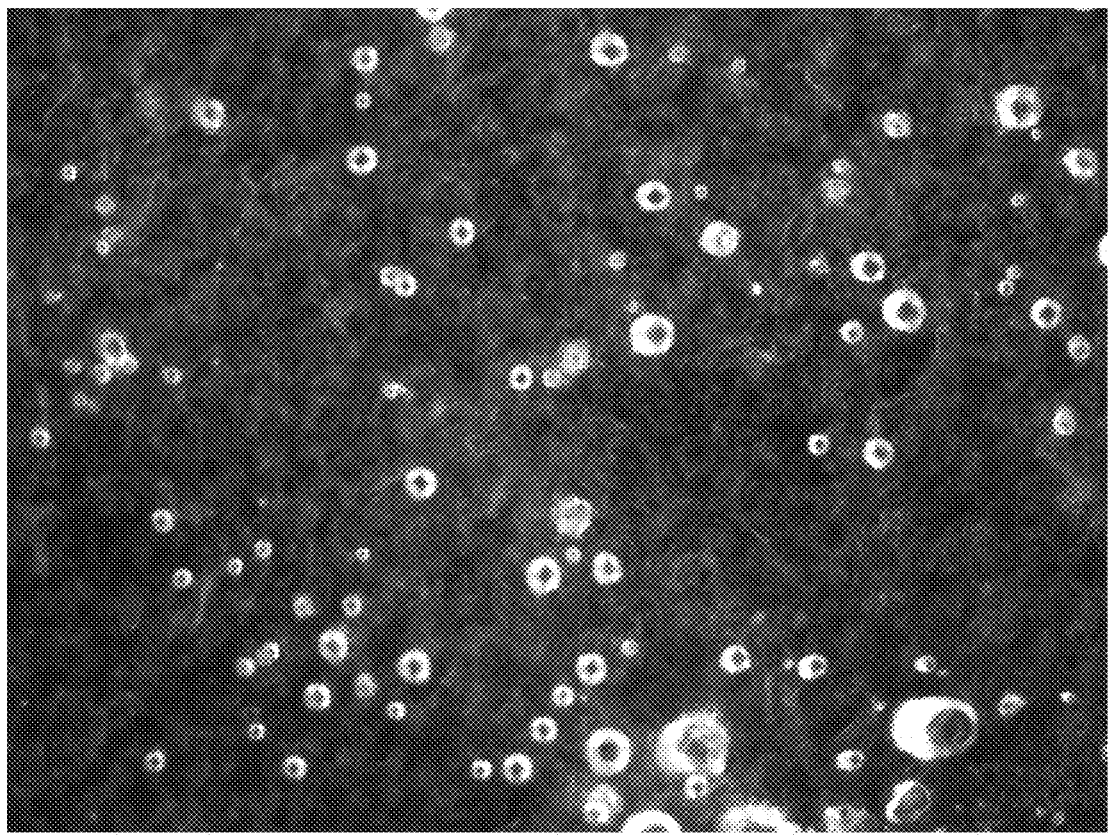
FIG. 1 is a black and white image of the coating provided in Comparative Example 1 below.

Unless otherwise indicated, whenever used herein, the terms set forth shall herein have the following meaning:

"Nanocomposite" means a composite material wherein at least one component comprises an inorganic phase, such as a smectite clay, with at least one dimension in the 0.1 to 100 nm range.

"Plates" means particles with two comparable dimensions significantly greater than the third dimension, for example, length and width of the particle being of comparable size but orders of magnitude greater than the thickness of the particle.

"Layered material" means an inorganic material such as a smectite clay that is in the form of a plurality of adjacent bound layers.

"Platelets" means individual layers of the layered material.

"Intercalation" means the insertion of one or more foreign molecules or parts of foreign molecules between platelets of the layered material, usually detected by X-ray diffraction technique, as illustrated in U.S. Pat. No. 5,891,611 (Majundar et al., line 10, Col. 5-line 23, Col. 7).

"Intercalant" refers to the aforesaid foreign molecule inserted between platelets of the aforesaid layered material.

"Exfoliation" or "delamination" means the separation of individual platelets in to a disordered structure without any stacking order. The term "substantially exfoliated" means that at least 80 percent of the original background-subtracted X-ray diffraction peak intensity (height) due to the (001) basal plane has been lost, as shown by a standard measurement. The term "(001) basal plane" shall refer to the spacing between a layer of silicate atoms in one plane to the corresponding layer of silicate atoms in another plane, including any material present between layers. This can also be referred to as basal plane spacing or d(001).

"Intercalated" refers to a layered material that has at least partially undergone intercalation. This can also include a material that has undergone both partial intercalation and partial exfoliation.

"Organoclay" means a clay material that has been modified by organic molecules.

"Swellable" refers to a layered material capable of showing an increase or expansion in spacing between layers resulting from insertion of species into the layered material.

Clays in a polystyrene-clay nanocomposites of the present invention can be ideally thought to exist in one of two structures: (1) intercalated clay wherein the clay lattice has been expanded to a thermodynamically defined equilibrium spacing due to the insertion of individual polystyrene chains, yet maintaining a long range order in the lattice, and (2) substantially or entirely exfoliated clay wherein singular clay platelets are randomly suspended in the polystyrene, resulting from extensive penetration of the polystyrene into the clay lattice and its subsequent delamination. As indicated above, the greatest property enhancements of polystyrene-clay nanocomposites are expected with the structure (2) mentioned above.

The clay material suitable for use in this invention can comprise any inorganic phase comprising layered materials in plates or other shapes with a significantly high aspect ratio. The clay materials suitable for this invention include phyllosilicates, for example, montmorillonite (such as particularly sodium montmorillonite, magnesium montmorillonite, and calcium montmorillonite), nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\cdot 2H_2O$, $CaPO_4CH_3$—$H_2O$, $MnHAsO_4$—$H_2O$, and $Ag_6Mo_{10}O_{33}$. Many useful clays are swellable. These swellable clays include phyllosilicates of the 2:1 type, as defined in clay literature (vide, for example, H. van Olphen *An Introduction to Clay Colloid Chemistry*, John Wiley & Sons Publishers, 1977, hereby incorporated by reference). Typical phyllosilicates with ion exchange capacity of 50 to 300 milliequivalents per 100 grams are preferred. Preferred clays for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Montmorillonite, hectorite and hydrotalcites are useful because of their effectiveness in the present invention and/or the commercial availability of these materials. In some embodiments, the clay is a montmorillonite, hectorite, saponite, nontronite, beidellite, volhonskoite, sauconite, magadiite, medmontite, kenyaite, or vermiculite.

The aforementioned clays can be natural or synthetic, for example synthetic smectite clay. This distinction can influence the particle size and/or the level of associated impurities. Typically, synthetic clays are relatively smaller than natural clays in lateral dimension, and therefore possess smaller aspect ratio. However, synthetic clays are purer and are of narrower size distribution, compared to natural clays, and may not require any further purification or separation. For this invention, the clay particles generally should have (on average) a lateral dimension of from about 0.01 μm to about 5 μm, and typically from about 0.05 μm to about 2 μm, and or from about 0.1 μm to about 1 μm. The thickness or the vertical dimension of the clay particles can vary (on average) of from about 0.5 nm to about 10 nm, and typically from about 1 nm to about 5 nm. The aspect ratio, which is the ratio of the largest and smallest dimensions of the clay particles can be greater than 10:1 and typically greater than 100:1. The aforementioned limits regarding the size and shape of the particles are designed to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects, such as haze, and can be abrasive to processing, conveyance and finishing equipment as well as the imaging layers.

The clay used in this invention is an organoclay that has been produced by interacting or pretreating the unfunctionalized clay with a suitable onium salt intercalant. Useful onium species include ammonium (primary, secondary, tertiary, and quaternary), phosphonium, or sulfonium derivatives of aliphatic, aromatic or arylaliphatic amines, phosphines and sulfides. Typically, onium ions can cause intercalation in the layers through ion exchange with the metal cations of the smectite clay.

The organoclay useful in the present invention is generally present in the nanocomposite in an amount of at least 1 and up to 50 weight %, or from about 20 to about 30 weight %.

The matrix polymer includes one or more non-polar hyperbranched polystyrenes that can have a variety of non-polar substituents on the styrene group within the polymer chain(s). By hyperbranched, we mean a polydispersed dendritic macromolecule that is imperfectly branched in which the branches do not emanate from a central core. Such hyperbranched polymers can be obtained from a number of commercial sources or prepared using known reactants and reaction conditions. For example, the hyperbranched polystyrene resin can have from 95% to 100% recurring units that are derived unsubstituted styrene.

The molecular weight of the hyperbranched polystyrene is at least 2,000 and can be as high as 1,000,000.

The hyperbranched polystyrene is present in the nanocomposite in an amount of at least 2 and up to 95 weight %, or from about 8 to about 20 weight %. The weight ratio of the onium finctionalized clay to the hyperbranched polystyrene resin is generally from about 1:1 to about 0.1:1 or from about 0.3:1 to about 0.2:1. The optimum ratio can be readily determined by routine experimentation for a given use.

The polymeric nanocomposite of this invention can be formed by melt blending the organoclay with the hyperbranched polystyrene resin at a temperature that is at or above the hyperbranched polystyrene melting point, with or without shear. Alternatively, the organoclay and hyperbranched polystyrene can be mixed in a suitable solvent or mixture of solvents.

The final mixture of the nanocomposite composition may include various optional components which are additives commonly employed with polymers. Such optional components may be added to the polymer melt or later and include nucleating agents, fillers, antioxidants, preservatives, plasticizers, impact modifiers, chain extenders, plasticizers, colorants, mold release lubricants, antistatic agents, pigments, fire retardants, and the like. These optional components and appropriate amounts are well known to those of skill in the art.

The nanocomposites of this invention exhibit useful properties. The nanocomposite compositions according to the invention are thermoplastic materials from which molded articles of manufacture having valuable properties can be produced by conventional shaping processes, such as melt spinning, casting, vacuum molding, sheet molding, injection molding and extruding. Examples of such molded articles are components for technical equipment, apparatus castings, household equipment, sports equipment, bottles, containers, components for the electrical and electronics industries, car components, circuits, fibers, foamed articles such as cups, sheets, building insulation, etc., semi-finished products which can be shaped by machining and the like. The use of the materials for coating articles by means of powder coating processes is also possible, as is their use as hot-melt adhesives. The molding compositions according to the invention are outstandingly suitable for specific applications of all types since their spectrum of properties can be modified in the desired direction in manifold ways.

Such articles can include a suitable matrix such as a polymeric matrix into which the polymeric nanocomposite is incorporated. The weight ratio of the matrix to the polymeric nanocomposite can be from about 10:1 to about 100:1.

The molding compositions according to the invention are outstandingly suitable for the production of sheets and panels having valuable properties. Such sheets and panels may be shaped by conventional processes such as vacuum processing, a molding processing, or by hot pressing to form useful objects. The sheets and panels according to the invention are also suitable for co-extruding with other materials or as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably obtained by co-extrusion, the sheets being bonded in the molten state. The surfaces of the sheets and panels, including those in the embossed form, can be improved or finished by conventional methods, for example by lacquering or by the application of protective films.

The compositions of this invention are useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness. In the film, the major plane of the platelet fillers is substantially parallel to the major plane of the film. The extent of parallelism of particles and film can be determined by X-ray diffraction analysis.

The following specific examples are presented to more particularly illustrate the invention and are not to be construed as limitations thereon.

Comparative Example 1

This specific example demonstrates the incompatibility of certain hyperbranched polymers with non-polar polymer matrices in contrast to U.S. Pat. No. 7,166,657 (Rao et al.). Into a glass vessel was charged 1.21 grams of a linear, non-hyperbranched polystyrene (Aldrich, average molecular weight 45,000), and 0.30 grams of a 90:10 weight:weight Hybrane P/S (hyperbranched polyester amide) Laponite RDS freeze dried powder mixture (a non-functionalized clay with no onium surface groups). The combined polystyrene and Hybrane P/S: Laponite RDS freeze dried powder mixtures are referred to as the "Comparative Composite." After dry mixing the Comparative Composite powder, the vessel was then placed on a Magna-4 hot plate at setting 5. The Comparative Composite was heated until it was melted and then stirred for 2 minutes using a stainless steel spatula. The resulting Comparative Composite melt was removed from the glass vessel using the spatula and placed on an aluminum plate and allowed to cool to room temperature (23° C.), giving a solid plaque. All mixing, melting and cooling steps occurred in ambient air.

Films were produced from a small portion of the Comparative Composite plaque using a Carver Press preheated to 210° C. A sandwich was made by placing an aliquot from the Comparative Composite plaque between two polyimide polymer sheets. This sandwich was placed on the Carver Press platens, followed by bringing the platens together, melting the aliquot from the Comparative Composite plaque, resulting in a film between the polyimide sheets. The sandwich was removed from the Carver Press, and the sandwich was quenched at room temperature (23° C.) between two aluminum plates. The polyimide sheets were peeled away, leaving a free standing Comparative Composite film. FIG. 1 is an optical micrograph image of the Comparative Composite film. It shows that the HybraneP/S is not miscible with linear polystyrene and would be considered unsuitable in a linear PS matrix.

Comparative Example 2

Into a glass vessel was charged 1.80 grams of a linear, non-hyperbranched polystyrene (Aldrich, average molecular weight 45,000) and 0.20 grams of Cloisite 10A (a functionalized organoclay having onium surface groups). The vessel was then placed on a Magna-4 hot plate at setting 5. The Comparative Example 2 mixture was heated until visually melted and then stirred for 2 minutes using a stainless steel spatula. The resulting melt was removed from the glass vessel using the spatula, placed on a preheated glass slide, then allowed to cool to room temperature (23° C.), giving a solid film composite on the glass slide, defined here as Sample A. All mixing, melting and cooling steps occurred in ambient air.

The XRD results shown below in TABLE I show the basal plane spacing for Sample A at each of 0, 2, 8, 24 hours of annealing at 225° C. in vacuum. At 0 hour, an increase in basal plane spacing was observed to be consistent with polymer intercalation into the clay. Annealing at 225° C. resulted in a decrease in basal plane spacing indicating that exfoliation of the clay did not occur.

Inventive Example 1

Into a glass vessel was charged 1.80 grams of hyperbranched polystyrene and 0.20 grams of Cloisite 10A (Cloisite 10A is a functionalized organoclay having onium surface groups). The vessel was then placed on a Magna-4 hot plate at setting 5. The Inventive Example 1 mixture was heated until visually melted and then stirred for 2 minutes using a stainless steel spatula. The resulting melt was removed from the glass vessel using the spatula, placed on a preheated glass slide, then allowed to cool to room temperature (23° C.), giving a solid film composite on the glass slide, defined here as Sample B. All mixing, melting and cooling steps occurred in ambient air.

The XRD results shown below in TABLE I show the basal plane spacing for Sample B at each of 0, 2, 8, 24 hours of annealing at 225° C. in vacuum. At 0 hour, an increase in basal plane spacing was observed consistent with polymer intercalation into the clay. Complete clay exfoliation occurred within 8 hours of annealing based on the loss of a basal plane diffraction peak in the XRD diffraction pattern.

Inventive Example 2

Into a glass vessel was charged 1.80 grams of a linear, non-hyperbranched polystyrene (Aldrich, average molecular weight 45,000), 0.16 g of hyperbranched polystyrene, and 0.04 grams of Cloisite 10A (a functionalized organoclay having onium surface groups). The vessel was then placed on a Magna-4 hot plate at setting 5. The Inventive Example 2 mixture was heated until visually melted and then stirred for 2 minutes using a stainless steel spatula. The resulting melt was removed from the glass vessel using the spatula, placed on a preheated glass slide, then allowed to cool to room temperature (23° C.), giving a solid film composite on the glass slide, defined here as Sample C. All mixing, melting and cooling steps occurred in ambient air.

The XRD results shown below in TABLE I show the basal plane spacing for Sample C at each of 0, 2, 8, 24 hours of annealing at 225° C. in vacuum. At 0 hour, an increase in basal plane spacing was observed consistent with polymer intercalation into the clay. Complete clay exfoliation occurred within 8 hours of annealing based on the loss of a basal plane diffraction peak in the XRD diffraction pattern.

TABLE I

| Sample | Basal plane d-spacing (angstroms) after annealing at 225° C. | | | | |
|---|---|---|---|---|---|
| | 0 hour | 2 hours | 4 hours | 8 hours | 24 hours |
| A | 38.4 | 15.7 | 14.8 | 14.8 | 14.8 |
| B | 42.1 | 42.1 | Nearly Exfoliated | Exfoliated | Exfoliated |
| C | 36.7 | 36.7 | Nearly Exfoliated | Exfoliated | Exfoliated |
| Neat Cloisite 10A | 19.4 | | | | |

The data in TABLE I show that Sample A containing linear, non-hyperbranched polystyrene does not exfoliate the clay while Samples B and C that contained hyperbranched polystyrene, exfoliated the clay.

Typical Preparation of a Hyperbranched Polymer:

This synthesis is based on a method that has been described in Polymer 2000, 41, 6027-6031 by Sherrington et al. A solution of 9.89 g (94.96 mmoles) of styrene, 0.94 g (4.75 mmoles) of ethylene glycol dimethacrylate, 1.15 g of dodecanethiol, and 0.16 g (1.00 mmoles) of 2,2'-azobisisobutyronitrile (AIBN) in 27 ml of toluene was sparged for 10 minutes with nitrogen. The reaction mixture was then heated to 70° C. for 15 hours. The resulting polymer was precipitated into cold methanol twice and dried in a vacuum oven at 60° C.

The invention has been described with reference to various embodiments. However, it will be appreciated that variations and modifications can be effected by a person of ordinary skill in the art without departing from the scope of the invention.

The invention claimed is:

1. A polymeric nanocomposite comprising a non-polar hyperbranched polystyrene resin and having dispersed therein an exfoliated or intercalated onium functionalized clay, wherein said hyperbranched polystyrene resin has from 95% to 100% of its recurring units that are derived from unsubstituted styrene.

2. The polymeric nanocomposite of claim 1 that is substantially exfoliated.

3. The polymeric nanocomposite of claim 1 wherein said clay is a smectite clay.

4. The polymeric nanocomposite of claim 1 wherein said clay is a montmorillonite, hectorite, saponite, nontronite, beidellite, volhonskoite, sauconite, magadiite, medmontite, kenyaite, or vermiculite.

5. The polymeric nanocomposite of claim 1 wherein the organoclay has been pretreated with an onium salt.

6. The polymeric nanocomposite of claim 1 wherein said hyperbranched polystyrene has a molecular weight of from about 2,000 to about 1,000,000.

7. The polymeric nanocomposite of claim 1 wherein the weight ratio of said onium functionalized clay to said hyperbranched polystyrene is from about 1:1 to about 0.1:1.

* * * * *